(12) United States Patent
Agrawal et al.

(10) Patent No.: US 7,941,749 B2
(45) Date of Patent: May 10, 2011

(54) COMPOSITION OF ELECTRONIC DOCUMENT LAYOUT

(75) Inventors: Siddharth Agrawal, Santa Clara, CA (US); Robert Parker, Beijing (CN); Dachuan Zhang, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 11/803,690

(22) Filed: May 15, 2007

(65) Prior Publication Data
US 2008/0288526 A1 Nov. 20, 2008

(51) Int. Cl.
*G06F 17/00* (2006.01)
*G06F 15/16* (2006.01)

(52) U.S. Cl. . 715/255; 715/204; 715/234; 707/999.102; 707/E17.022

(58) Field of Classification Search .......... 715/200–205, 715/207, 209, 210, 231, 234, 235, 238, 243, 715/253–256, 273, 730, 731, 760; 707/602, 707/805, 912, 917, 999.1, 999.101, 999.102, 707/E17.008, E17.022
See application file for complete search history.

(56) References Cited

U.S. PATENT DOCUMENTS

| | | | |
|---|---|---|---|
| 4,441,829 A | | 4/1984 | Hebert, Jr. et al. |
| 5,379,373 A | | 1/1995 | Hayashi et al. |
| 5,459,827 A | | 10/1995 | Allouche et al. |
| 5,603,021 A | | 2/1997 | Spencer et al. |
| 6,026,417 A | * | 2/2000 | Ross et al. ............ 715/210 |
| 6,038,567 A | * | 3/2000 | Young ............ 715/210 |
| 6,088,711 A | * | 7/2000 | Fein et al. ............ 715/269 |
| 6,122,649 A | * | 9/2000 | Kanerva et al. ............ 715/210 |
| 6,324,551 B1 | * | 11/2001 | Lamping et al. ............ 715/229 |
| 6,397,231 B1 | * | 5/2002 | Salisbury et al. ............ 715/234 |
| 6,457,013 B1 | * | 9/2002 | Saxton et al. ............ 707/795 |
| 6,826,727 B1 | * | 11/2004 | Mohr et al. ............ 715/235 |
| 7,200,668 B2 | * | 4/2007 | Mak et al. ............ 709/230 |
| 7,257,772 B1 | * | 8/2007 | Jones et al. ............ 715/234 |
| 2003/0172168 A1 | * | 9/2003 | Mak et al. ............ 709/230 |
| 2003/0222890 A1 | * | 12/2003 | Salesin et al. ............ 345/629 |
| 2004/0225960 A1 | | 11/2004 | Parikh et al. |
| 2005/0149861 A1 | * | 7/2005 | Bishop et al. ............ 715/515 |
| 2006/0136809 A1 | * | 6/2006 | Fernstrom ............ 715/505 |
| 2006/0136827 A1 | | 6/2006 | Villaron et al. |
| 2006/0242163 A1 | | 10/2006 | Miller et al. |
| 2006/0242602 A1 | | 10/2006 | Schechter et al. |
| 2006/0259875 A1 | | 11/2006 | Collins et al. |
| 2006/0277452 A1 | * | 12/2006 | Villaron et al. ............ 715/500 |
| 2007/0182370 A1 | * | 8/2007 | Tsai et al. ............ 320/112 |

OTHER PUBLICATIONS

Drucker et al., "Comparing and Managing Multiple Versions of Slide Presentattions," ACM, Oct. 15-18, 2006, pp. 47-56.* Anonymous, "Technical note TN2073: Deconstructing a Keynote 1 x.Document: Part One—Slides," May 20, 2003, 27 pages.*
"Composite View—Design Patterns," Date: Dec. 26, 2006, pp. 1-3, http://java.sun.com/blueprints/patterns/CompositeView.html.
"Online Manual/Working with eXe, WikiEducator," Date: Dec. 26, 2006, pp. 1-11, http://www.wikieducator.org/Online_manual/Working_with_eXe.

* cited by examiner

*Primary Examiner* — Maikhanh Nguyen
(74) *Attorney, Agent, or Firm* — Merchant & Gould

(57) ABSTRACT

Resolution and composition of electronic document layout are provided. An intermediate text data structure may be generated to hold a "resolved" rich text state for a given document. Properties contained in the "resolved" rich text state are a composite of all relevant properties including user defined and entered properties and including properties associated with the document according to a pre-built document context. This text body resolution process then may be utilized for generating a composite text layout for the text streams associated with a plurality of document components for generating a single rich text stream for presentation to and editing by a user.

10 Claims, 4 Drawing Sheets

COMPOSITION OF ELECTRONIC DOCUMENT LAYOUT

BACKGROUND OF THE INVENTION

Electronic documents enabled by rich applications support editing of document properties by applications/document users. In addition, a variety of document properties may originate from the context of a document itself. An example of such a context is a document template that has a variety of "built-in" contextual document properties, sometimes referred to as a document "theme." Unfortunately, it is difficult to maintain properties applied to a document by a user separately from properties automatically applied to the document according to the document context or "theme" while being able to display an editable version of the document in a final form in which all relevant properties are combined.

In addition, according to prior systems and methods, it is difficult to generate and display a series of rich text elements in a document resource, such that they appear to a user as if they are a single rich text element. Prior methods and systems approach this problem by generating a temporary rich text element by concatenating a series of rich text elements and by then performing layout and display on the concatenated series. However, the efficiency of such an approach suffers from the need to keep the temporary rich text element synchronized with the underlying rich text data in each element of the series.

It is with respect to these and other considerations that the present invention has been made.

SUMMARY OF THE INVENTION

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing automated composition of electronic document layout. According to an embodiment, an intermediate text data structure may be generated to hold a "resolved" rich text state for a given document. The resolved rich text state is a data structure that is the same as a normal data structure used to represent a rich text stream. However, the properties contained in the "resolved" rich text state are a composite of all relevant properties including user defined and entered properties and including properties associated with the document according to a pre-built document context.

The resolved rich text state may be maintained in a form that is suitable for display to a user. Thus, efficient layout and editing of a "themed" document may be accomplished. During a property resolution process for a given document, a text body resolved object may be created and may be managed by a text body resolver object for each rich text element contained in an associated document. During a synchronization process, each element in the series of rich text elements may be sequentially processed, and a resulting portion of rich text that needs to be updated may be "spliced" into a correct position into the "resolved" text body of the associated document.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
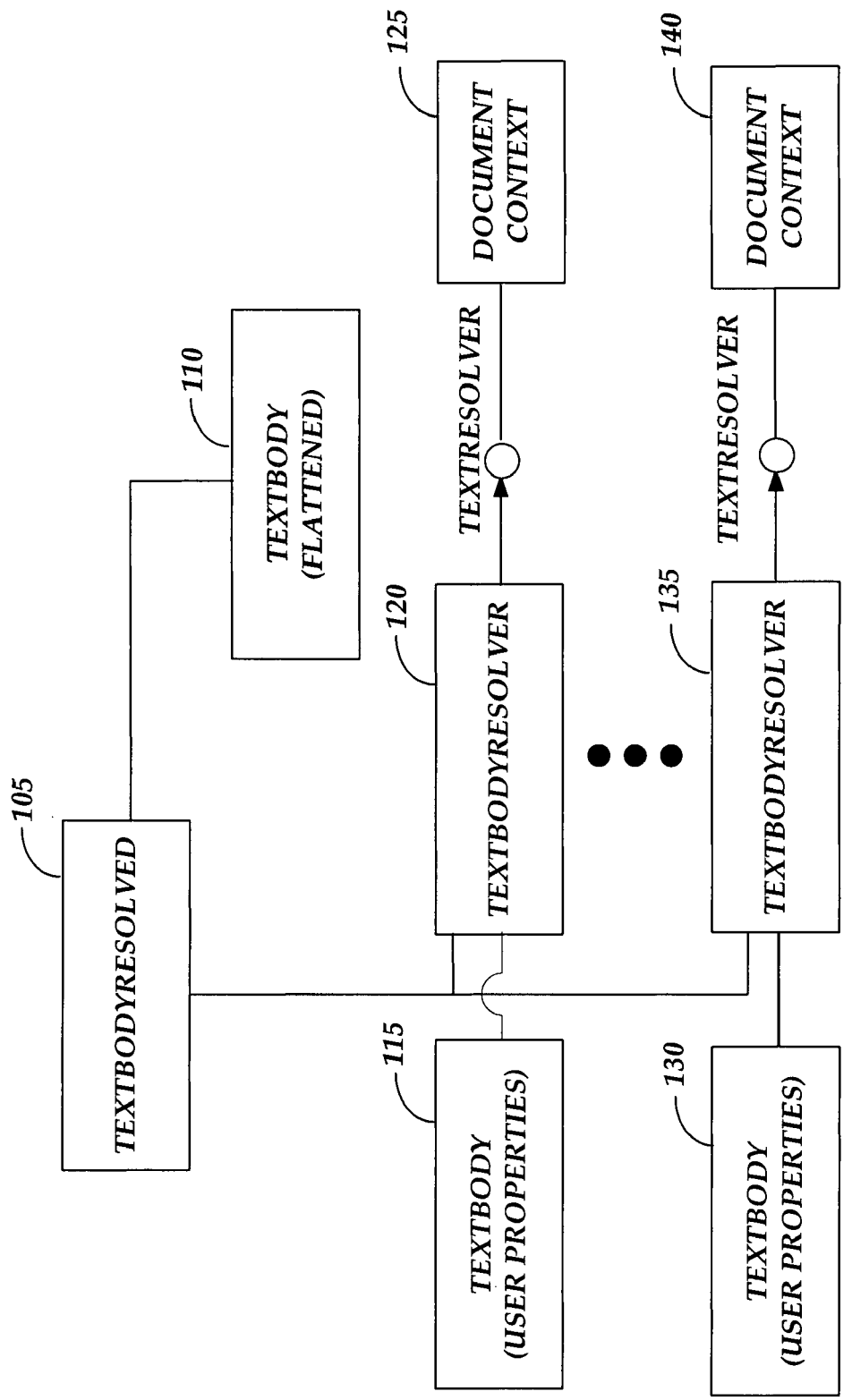
FIG. 1 is a simplified block diagram illustrating a text body resolution system for compositing of multiple rich text elements of a document.

As briefly described above, embodiments of the present invention are directed to automated composition of various components of an electronic document into a single rich text stream that may be edited by an editing user. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Text Body Resolution

FIG. 1 is a simplified block diagram illustrating a text body resolution system 100 for compositing of multiple rich text elements of a document. According to embodiments of the present invention, the text body resolver objects 120, 135 are illustrative of software modules that are operative to receive user-defined text properties, for example, formatting properties, applied to one or more text components of a document and for combining the user-defined text properties with a document context 125, 140 which includes document-defined text properties, for example, properties associated with a document template, including headings, footers, pre-defined text sections, pre-defined text streams, and the like. Combining the user-defined properties and document context properties allows the text body resolver objects to create an intermediate data structure, referred to herein as a text body resolved 105 for holding a "resolved" rich text state which may be output as a flattened rich text stream, referred to and illustrated as a flattened text body 110.

According to one embodiment, each text body resolver object associated with each text body may be referred to or pointed to from the edit list so that each text body resolver object associated with each text body may be called for text body resolution when an associated text body is edited, as described herein. A master text body resolved object 105 may be utilized for directing the activities of the text body resolution process 100 and of the individual text body resolver objects 120, 135. That is, as will be described below, the text body resolved object 105 manages the list of text body resolver objects and the process of generating the flattened text body 110.

According to an embodiment, a first text body (user properties) 115 may be associated with a first rich text stream applied to a portion of a given document, for example, a "title" portion of a document. A corresponding document context 125 may include document context or "theme" properties associated with the corresponding "title" section of the document. Similarly, a second text body (user properties) 130 may be associated with a different rich text stream containing user-defined properties for a different portion of the document, for example, a "summary" section of the document. The document context 140 may correspondingly include the document context or "theme" properties associated with the "summary" section of the document. As should be appreciated, a rich text stream in the form of a text body (user properties) 115, 130 may be received for many different portions of a given document to which a user has defined certain properties, and may be matched to a corresponding document context 125, 140 for resolution into a single text body resolved state 105 by a corresponding text body resolver object 120, 135.

According to an embodiment, the text body resolved data structure 105 includes data for each individual text body 115, 130 associated with different portions of the associated document. According to one embodiment, each text body comprising the text body resolved data structure 105 may be annotated with a version stamp showing the most recent date and time on which an individual text body 115, 130 has been edited and resolved by the text body resolution process 100. That is, for any given document, one or more portions of the document may not be edited at all during a given document editing process. Because editing version stamps are applied to each individual text body comprising the text body resolved data structure 105, and ultimately the flattened text body 110, the text body resolution process may readily determine which portions of a given document require resolution with an associated document context 125, 140 when changes are subsequently made to individual text bodies 115, 130. According to an embodiment, the text body resolved data structure 105 thus includes an array of individual text bodies 115, 130 that may be reviewed during the text body resolution process for document resolution, as described herein.

The flattened text body 110 is a rich text stream including user-defined text properties and text properties associated with a pre-defined document context 125, 140. The resolved rich text state in the flattened text body 110 may be efficiently maintained in a form suitable for display to a user. Thus, efficient layout and editing of an associated themed document may be accomplished. For example, if a user obtains a document template for preparing a resume document that includes a pre-defined document context or "document theme," the user may edit the document by applying user-defined data to the document and by applying various formatting properties to the document, for example, bold facing, color change, font change, and the like, without destroying the document context applied to the document template. That is, according to the text body resolved architecture illustrated in FIG. 1, the text body resolver objects 120, 135 are operative to receive the user-defined properties and to receive separately the document context properties and to combine each of the separate rich text streams associated with each of the user-defined properties and the document context properties to create a resolved rich text state.

As should be appreciated, each time a user subsequently modifies or edits a portion of such a resolved document, the text body resolver objects associated with each rich text stream may be re-resolved via a synchronization process to form a subsequent text body resolved state 105 and associated flattened text body 110. Each time a subsequent edit is made to a subject document, the text body resolution process illustrated in FIG. 1 may be invoked for applying user edits to the appropriate document context to create a modified version of the flattened text body 110. Thus, a change to a single text body 115, 130 may be resolved to the text body resolved data structure 105 during the synchronization process whereby only the edited text bodies are processed in association with corresponding document contexts to create an up-to-date text body resolved data structure 105 and associated flattened text body 110.

Figure 2:
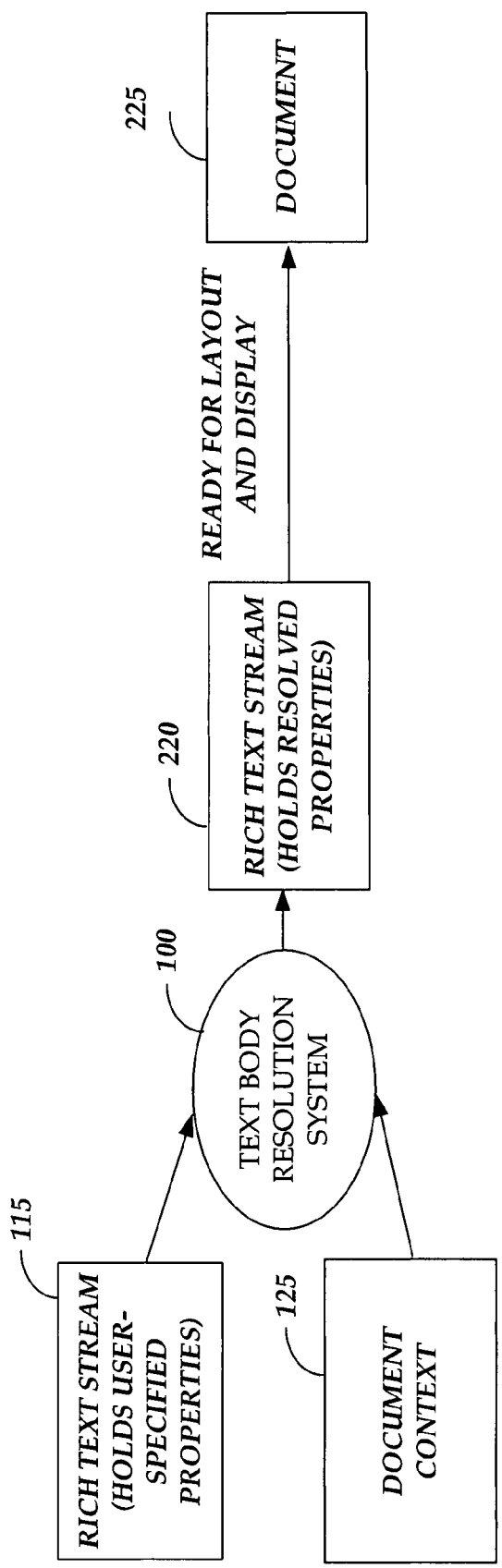
FIG. 2 is a simplified block diagram illustrating composition of properties in construction of a resolved rich text stream.

FIG. 2 is a simplified block diagram illustrating composition of properties in construction of a resolved rich text stream. The text body resolution process, described above with reference to FIG. 1, occurs when a functionality of an associated application requires an up-to-date state of the flattened text body 110 for presentation, for example, for display on a user's computer display screen. For example, if a user selects a document that has been edited for display by the user's word processing application, the word processing application may invoke the text body resolution process described herein for displaying the most up-to-date version of the selected document in the form of the flattened text body 110, described in FIG. 1.

When the text body resolution process is required for a given document, for example, when the document has been selected for display in an example word processing application, the text body resolver objects 120, 135 walks through the array of text bodies 115, 130 associated with the text body resolved data structure 105 and the flattened text body 110 to determine which if any individual text bodies 115, 130 need to be processed, as described above with reference to FIG. 1. For example, if a given text body resolved data structure 105 is comprised of five text bodies 115, 130, and a user has edited one of the five text bodies, the text body resolver 120, 135 associated with the edited text body will locate the edited text body based on a comparison of the version stamp applied to the edited text body with the corresponding text body contained in the text body resolved data structure 105.

Referring to FIG. 2, once the appropriate text body resolver object 120, 135 locates an edited text body 115, 130, the text body resolver object 120, 135 generates a record of character properties, paragraph properties, formatting properties, and the like associated with a range of text applicable to the edited text body. The text body resolver 120, 135 then combines the edited text body properties 115 with the associated document context 125, as described above, to create a new instance of the text body resolved data structure 105 in the form of a rich text stream 220 which holds the resolved text properties and which is ready for layout and display in an associated document 225 in the form of the flattened text body 110.

Figure 3:
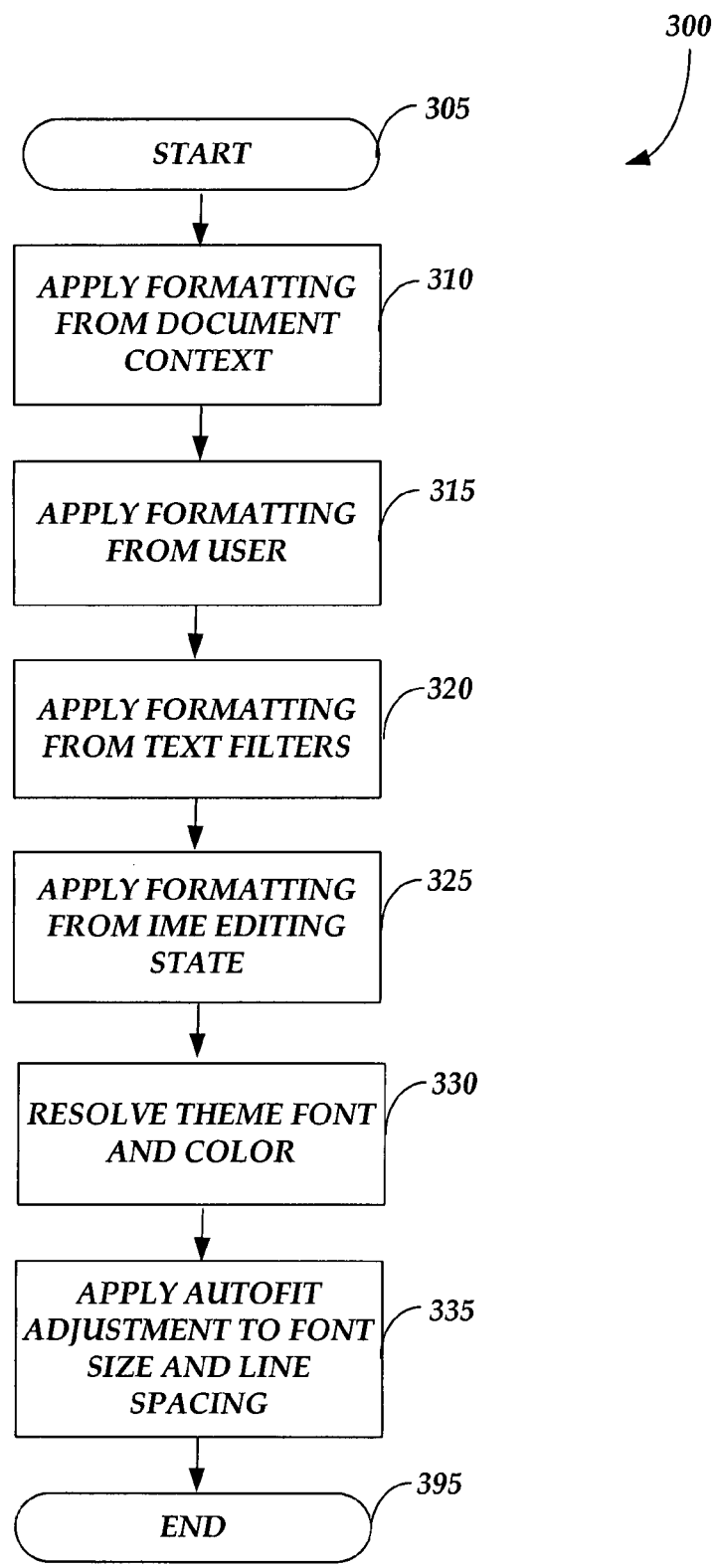
FIG. 3 is a logical flow diagram illustrating a document property composition method with which a final flattened text body with associated document properties is generated.

For purposes of further description of the text body resolution process described above, FIG. 3 is a logical flow diagram of a method employed by the text body resolution process 100 for generating the rich text stream 220 (FIG. 2) for the text body resolved data structure 105 after the resolution process 100 receives an edited rich text stream 115 and an associated document context 125, as described above. The routine 300 begins at start operation 305 and proceeds to operation 310 where the associated text body resolver object 120, 135 first applies formatting for a given edited text body 115, 130 from the associated document context 125, 140.

In order to receive the information from the associated document, the text body resolver 120, 135 places a call to the document via an application programming interface, referred to herein as a text body resolver interface for requesting the rich text stream associated with the text body 115 containing user-defined properties and for obtaining an associated document context 125 for generating the text body resolved data structure 105. At operation 310, the text body resolver object 120, 135 contacts the document via the text body resolver interface and obtains any default settings or other document context information that may be controlled by the application in use with the document, for example, a word processing application, a slide presentation application, a spreadsheet application, etc.

At operation 310, the text body resolver object applies formatting or other properties associated with the document context received from the document to a new version of the text body resolved data structure 105. At operation 315, the text body resolver object applies any user-specified properties for the associated text body 115 based on the version stamp comparison described above. For example, if a user has applied a formatting change, for example, the application of a new font to a given text range, the text body resolver object will apply the new formatting properties to the associated text range on a text run by text run basis or on a character by character basis, as required. The changes found in the rich text stream of the text body 115 by the text body resolver 120 are then applied to the text body resolved data structure 105. According to one embodiment, the formatting specified at any step later in the process overrides, and hence takes precedence over any formatting that was done earlier. Thus, the global formatting specified by the document context is the first step, such that it will appear in the final document only in the absence of any other formatting.

At operation 320, any text filters associated with the text range containing the rich text stream 115 are applied by the text body resolver 120 to the text body resolved data structure 105. For example, a well-known slide presentation application known as POWERPOINT® manufactured by MICROSOFT CORPORATION includes an outline pane that may be deployed adjacent to a display of slides comprising a slide presentation. The outline pane may be used for displaying an outline of text contained in the slides comprising the slide presentation, but the text in the outline pane may be displayed according to a default formatting that is different from formatting applied to individual text runs in the associated slides. In order to apply different formatting to the text contained in the outline pane as opposed to the corresponding text contained in the associated slides, text filters are applied to the text to filter out the formatting applied to the text in the corresponding slides. According to embodiments of the present invention, any text filters that are applied to text contained in the received rich text stream of the text body 115 are applied to the edited rich text stream by the text body resolver object so that when the rich text stream is integrated with document properties in the text body resolved data structure 105, desired text filter settings will be applied.

At operation 325, any properties associated with an input method editor (IME) used in connection with the received rich text stream or the received document context are applied to the text body resolved data structure 105 by the text body resolver object. For example, if the rich text stream is received from an application using a Japanese-based input method editor (IME), any properties imparted to the characters of the rich text stream associated with the construction of complex Japanese characters will be applied to the resulting text body resolved data structure 105 by the text body resolver object.

At operation 330, any document theme properties, for example, document-specified fonts, colors, and the like, are applied to the text body resolved data structure 105 by the text body resolver object. At operation 335, any additional properties, for example, autofit adjustments for font size and line spacing applied to the associated document are applied by the text body resolver object to the text body resolved data structure 105. As described above, the now up-to-date text body resolved data structure may be utilized for outputting the flattened text body 110 for presentation to the requesting user by the associated software application. The method ends at operation 395.

Composite Text Layout

At various times, a user may be engaged in editing a document comprised of various document components that are not maintained in a single text stream. It would be advantageous to allow a user to receive the text associated with such disparate document components in a single rich text stream for editing purposes. For example, as described above, a slide presentation outline pane may include an outline of all text contained in each slide comprising a slide presentation. For example, a slide presentation document may include 20 slides, each slide having different document contexts 125, 140. For example, a first slide in an example slide presentation document may include a document context having a title section having a first default formatting property and a summary section having a second default formatting property. Slides 2-10 of the example slide presentation document may have a "bullet" formatting structure applied to each slide in the associated slides. Slides 11 and 12 may have a document context associated with a mixture of textual content and non-textual content, for example, pictures with textual descriptions associated therewith, and so on. According to one such slide presentation application, an outline pane may be deployed adjacent to a display of the individual slides comprising a slide presentation document, and the outline pane may include the textual content contained in each slide of the associated slide presentation document presented in outline form where each text run presented in the outline pane is presented according to a single set of formatting properties, for example, font type, font size, color, etc. According to embodiments of the present invention, the text body resolution process 100, described above, may be utilized for generating a composite text layout for the text streams associated with a plurality of document components, for example, multiple presentation slides, for generating a single rich text stream for presentation to and editing by a user, such as described for the example outline pane associated with a slide presentation document.

According to the composite text layout embodiments of the present invention, if a request is passed to a software application in use, for example, a slide presentation application for the presentation of a document comprised of the textual content associated with a plurality of text bodies 115, 130 associated with a given document, the text body resolution process 100 may be invoked for generating a single rich text stream comprised of each of the requested rich text streams. For example, if a user selects an outline pane for the example slide presentation application and document described above, the associated slide presentation application may call the text body resolution process 100 for generation of a document comprised of a single rich text stream which in turn is comprised of each of the rich text streams making up each of the disparate slides contained in the selected slide presentation document.

A document context 125, 140 may be generated for applying a default set of properties to each rich text stream that will be extracted from the text body resolved data structure 105 for generating the composite text layout, as described herein.

That is, the single rich text stream that will make up a composite document (that is, the composite flattened text body 110), described herein, may receive document properties, for example, a default font type, font size, coloring, line spacing and structure, etc. according to a document context 125, 140. Thus, when the composite text layout document is displayed, the rich text stream making up the composite text layout document will exhibit properties of the associated document context 125, 140 as opposed to the properties that are associated with the text streams extracted from each text body utilized for generating the composite text layout document.

When a request is received by the text body resolution process 100 for the composite text layout, described herein, the text body resolver object directing the activities of the text body resolution process 100 may parse or walk through the text body resolved data structure 105 for the associated document, for example, the example slide presentation document, and extract each text body 115, 130 that includes textual content that is required for the requested composite text layout. The text body resolver object then retrieves a document context 125 associated with the requested composite text layout, for example, the outline structure required for the outline pane for the associated example slide presentation document, and the text body resolver object generates a new text body resolved data structure 105 with each of the extracted text bodies based on the document context retrieved for the requested composite text layout. A flattened text body 110 is then generated comprised of a single rich text stream that may be presented to the user, for example, in the example outline pane described above. As should be appreciated, description of the present invention in terms of the example slide presentation application outline pane is for purposes of illustration only and is not limiting of the vast number of situations in which a user may desire a single rich text stream comprised of textual content from various portions or components of a given document.

According to an embodiment, once the composite text layout for the desired document is generated, as described above, edits may be made to the composite text layout document, and the edits may be applied to the composite text layout document and/or back to the original text bodies from which edited portions of the composite text layout document were extracted. For example, if a user edits a word in the composite text layout document displayed in a slide presentation application outline pane, as described above, the edit may be made to the composite text layout document displayed in the outline pane, and the edit may likewise be made to text contained in an applicable slide in the associated slide presentation document. In the first instance, a synchronization process may be employed by the text body resolution process 100, wherein an updated version of the text body resolved data structure 105 for the composite text layout document is generated in association with an edit made to the composite text layout document.

In the second instance, in the composite text layout document, an identification may be maintained of the corresponding text bodies 115, 130 for each character position in the rich text stream of the composite text layout document so that changes made in the composite text layout document may be mapped back to and changed in the corresponding text bodies 115, 130. Alternatively, the synchronization process may be employed by the text body resolver process 100 for retrieving a text body resolved data structure 105 associated with the document from which the composite text layout document was generated, for example, the slide presentation document, and the edit made by the user to the composite text layout document may be presented to an appropriate text body resolver object for generation of an updated text body resolved data structure 105 for the original document, for example, the slide presentation document. Thus, if desired, the edit made to the composite text layout document may be pushed out to the document from which it was composed.

As should be appreciated, applying the edit to both the composite text layout document and to the document from which the composite text layout document was composed may be configurable wherein application of a given edit may or may not be pushed out to the document from which the composite text layout document was composed. For example, a user may wish to bold face a word in a composite text layout document presented in an outline pane for a slide presentation document to call the word to the user's attention in the outline pane, but the user may not wish for the associated word in the slide presentation document to be bold faced in response.

Operating Environment

Figure 4:
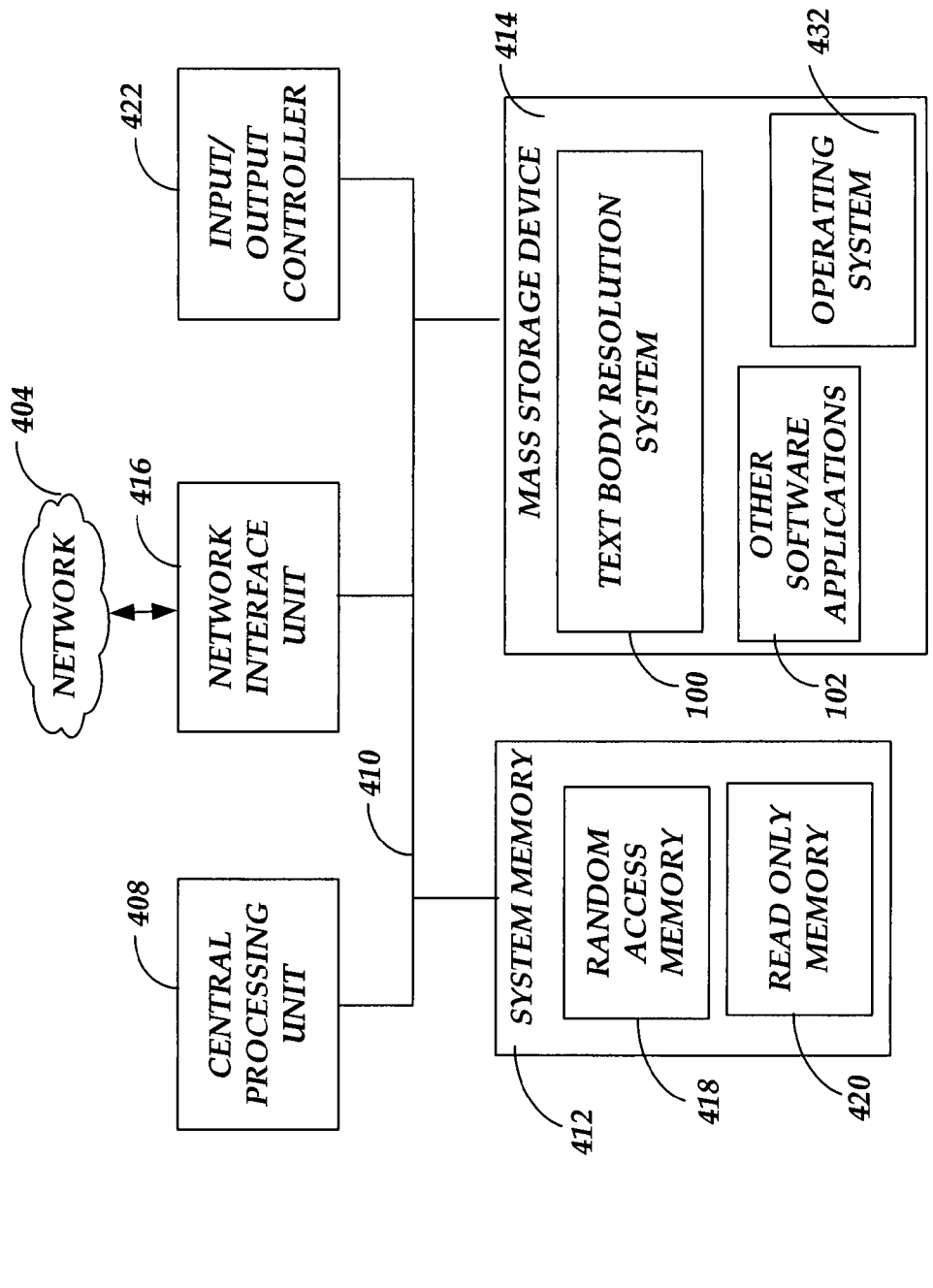
FIG. 4 is a simplified block diagram illustrating an example computing operating environment in which embodiments of the present invention may be practiced.

Referring now to FIG. 4, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 4, an illustrative operating environment for embodiments of the invention will be described. As shown in FIG. 4, computer 400 comprises a general purpose desktop, laptop, handheld, mobile or other type of computer (computing device) capable of executing one or more application programs. The computer 400 includes at least one central processing unit 408 ("CPU"), a system memory 412, including a random access memory 418 ("RAM") and a read-only memory ("ROM") 420, and a system bus 410 that couples the memory to the CPU 408. A basic input/output system containing the basic routines that help to transfer information between elements within the computer, such as during startup, is stored in the ROM 420. The computer 400 further includes a mass storage device 414 for storing an operating system 432, application programs, and other program modules.

The mass storage device 414 is connected to the CPU 408 through a mass storage controller (not shown) connected to the bus 410. The mass storage device 414 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed or utilized by the computer 400.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 400.

According to various embodiments of the invention, the computer 400 may operate in a networked environment using logical connections to remote computers through a network 404, such as a local network, the Internet, etc. for example. The computer 402 may connect to the network 404 through a network interface unit 416 connected to the bus 410. It should be appreciated that the network interface unit 416 may also be utilized to connect to other types of networks and remote computing systems. The computer 400 may also include an input/output controller 422 for receiving and processing input from a number of other devices, including a keyboard, mouse, etc. (not shown). Similarly, an input/output controller 422 may provide output to a display screen, a printer, or other type of output device.

As mentioned briefly above, a number of program modules and data files may be stored in the mass storage device 414 and RAM 418 of the computer 400, including an operating system 432 suitable for controlling the operation of a networked personal computer, such as the WINDOWS® operating systems from MICROSOFT CORPORATION of Redmond, Wash. The mass storage device 414 and RAM 418 may also store one or more program modules. In particular, the mass storage device 414 and the RAM 418 may store application programs, such as a software application 424, for example, a word processing application, a spreadsheet application, a slide presentation application, a database application, etc.

According to embodiments of the present invention, a text body resolution system 100 is illustrated with which the text body resolution process and composite text layout process described above may be performed. According one embodiment, all components of the system 100 may be operated as an integrated system stored and operated from a single computing device 400. Alternatively, one or more components of the system 100 may be stored and operated at different computing devices 400 that communicate with each other via a distributed computing environment. Software applications 102 are illustrative of software applications operative to generate and display documents in accordance with the text body resolution system 100 described herein. Examples of software applications 102 include, but are not limited to, word processing applications, slide presentation applications, spreadsheet applications, desktop publishing applications, and the like.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein. Although the invention has been described in connection with various embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A method of generating a document containing user-defined properties and document-defined properties, comprising:
    receiving a document having one or more components, each of the one or more components having document-defined properties according to a document context applied to the document;
    receiving a text stream containing one or more portions of user-defined information applied to the document;
    generating a resolved document object for each of the one or more components of the document, where each resolved document object contains one of the one or more document components and a corresponding one of the one or more portions of user-defined information and where any document-defined properties associated with the one of the one or more document components are applied to the corresponding one of the one or more portions of user-defined information;
    assembling each of the resolved document objects into a resolved text body data structure for the document; and
    generating a composite text layout document composed of a selected one or more of the resolved document objects assembled into the resolved text body data structure for the document, wherein generating a composite text layout document composed of a selected one or more of the resolved document objects assembled into the resolved text body data structure for the document includes:
        receiving a selection of one or more of the resolved document objects for application to the composite text layout document;
        extracting a textual information from each selected one or more resolved document object;
        applying a document context associated with the composite text layout document to each extracted textual information from each selected one or more resolved document object;
        generating a resolved document object for each extracted textual information after application of the document context associated with the composite text layout; and
        assembling each of the resolved document objects for each extracted textual information into a resolved text body data structure for the composite text layout document.

2. The method of claim 1, further comprising generating a flattened text body from the resolved text body data structure for display and editing.

3. The method of claim 1, wherein generating a resolved document object for each of the one or more components of the document includes:
    receiving each of the one or more portions of user-defined information at a text body resolver object operative to apply any document-defined properties of a given document component to a corresponding portion of user-defined information;

parsing the document for a document component associated with each of the one or more portions of user-defined information;

for a given portion of user-defined information, extracting document-defined properties from an associated document component;

applying the document-defined properties extracted from the associated document component to the given portion of user-defined information; and saving the given portion of user-defined information with the applied document-defined properties as a resolved document object for the document component associated with the given portion of user-defined information.

4. The method of claim 3, after assembling each of the resolved document objects into a resolved text body data structure for the document, further comprising:

in response to receiving an edit to a given one of the resolved document objects where the edit includes an edit to user-defined information or to a document-defined property associated with the given one of the resolved document objects;

calling a text body resolver object associated with the edited resolved document object; and generating an updated resolved document object.

5. The method of claim 4, further comprising replacing the edited resolved document object in the resolved text body data structure with the updated resolved document object.

6. The method of claim 1, prior to extracting a textual information from each selected one or more resolved document object, parsing the resolved text body data structure for locating each selected one or more resolved document object for application to the composite text layout document.

7. A system having at least one processor for generating a document containing user-defined properties and document-defined properties, comprising:

a text body resolver object operative to receive a document having one or more components, each of the one or more components having document-defined properties according to a document context applied to the document;

to receive a text stream containing one or more portions of user-defined information applied to the document;

to generate a resolved document object for each of the one or more components of the document, where each resolved document object contains one of the one or more document components and a corresponding one of the one or more portions of user-defined information; and to pass each of the resolved document objects to a text body resolved object for assembly of a text body data structure for the document, wherein the text body resolved object is further operative:

to generate a composite text layout document composed of a selected one or more of the resolved document objects assembled into the resolved text body data structure for the document;

to receive a selection of one or more of the resolved document objects for application to the composite text layout document;

to extract a textual information from each selected one or more resolved document object;

to apply a document context associated with the composite text layout document to each extracted textual information from each selected one or more resolved document object;

to generate a resolved document object for each extracted textual information after application of the document context associated with the composite text layout; and to pass each of the resolved document objects to the text body resolved object assembly of each extracted textual information into a resolved text body data structure for the composite text layout document.

8. The system of claim 7, wherein the text body resolved object is operative to generate a flattened text body from the resolved text body data structure for display and editing.

9. The system of claim 7, wherein the text body resolved object is operative to manage operation of a text body resolver object associated with each of the one or more document components.

10. The system of claim 7, wherein the text body resolved object is further operative to receive each of the one or more portions of user-defined information for applying any document-defined properties of a given document component to a corresponding portion of user-defined information;

to parse the document for a document component associated with each of the one or more portions of user-defined information;

to extract document-defined properties from an associated document component for a given portion of user-defined information;

to apply the document-defined properties extracted from the associated document component to the given portion of user-defined information; and to save the given portion of user-defined information with the applied document-defined properties as a resolved document object for the document component associated with the given portion of user-defined information.

* * * * *